(12) United States Patent
Dalal et al.

(10) Patent No.: US 7,320,284 B2
(45) Date of Patent: Jan. 22, 2008

(54) NON-OFFSET IMAGE FORMING DEVICE WITH STIMULATED INK KEY INTERFACE AND METHOD

(75) Inventors: Edul N. Dalal, Webster, NY (US); D. Rene Rasmussen, Pittsford, NY (US); Norman W. Zeck, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 381 days.

(21) Appl. No.: 11/214,912

(22) Filed: Aug. 31, 2005

(65) Prior Publication Data

US 2007/0056458 A1    Mar. 15, 2007

(51) Int. Cl.
*B41C 1/12*    (2006.01)
*B41J 29/38*    (2006.01)
*B41F 31/04*    (2006.01)

(52) U.S. Cl. .................. 101/483; 101/485; 400/76
(58) Field of Classification Search ................ 101/483, 101/485, 365
See application file for complete search history.

(56) References Cited

U.S. PATENT DOCUMENTS

| | | | |
|---|---|---|---|
| 4,008,664 A | * | 2/1977 | Crum et al. ................. 101/365 |
| 4,551,729 A | * | 11/1985 | Kubo et al. ................. 347/178 |
| 4,639,881 A | | 1/1987 | Zingher |
| 4,773,327 A | * | 9/1988 | Moetteli ..................... 101/365 |
| 5,884,118 A | | 3/1999 | Mestha et al. |
| 6,024,018 A | | 2/2000 | Darel et al. |
| 6,744,531 B1 | | 6/2004 | Mestha et al. |
| 6,750,992 B1 | | 6/2004 | Holub |
| 6,760,056 B2 | | 7/2004 | Klassen et al. |
| 6,819,352 B2 | | 11/2004 | Mizes et al. |

\* cited by examiner

*Primary Examiner*—Daniel J. Colilla
*Assistant Examiner*—Marissa Ferguson-Samreth
(74) *Attorney, Agent, or Firm*—Oliff & Berridge PLC

(57) ABSTRACT

An ink key simulator for image forming devices may simulate the effect of ink key adjustments in offset presses. The image adjustment may be made in response to activation of a simulated ink key, for example, by adjusting the pixel values of the stored data and/or by adjusting imaging light source intensity within a given region of the image. Using the ink key simulator, adjustments to image quality from printers may be made on-the-fly using an interface which is familiar to the operators of offset presses.

20 Claims, 7 Drawing Sheets

US 7,320,284 B2

NON-OFFSET IMAGE FORMING DEVICE WITH STIMULATED INK KEY INTERFACE AND METHOD

BACKGROUND

This invention is directed to non-offset image forming devices, such as xerographic or inkjet digital printers and copiers.

Offset printing presses are presses which may print an image lithographically defined on a special plate, by applying ink to the plate and transferring the ink to a sheet of paper via a rubber blanket roller. The output characteristics of the image may be determined, in part, by the amount of ink applied to a given region of the plate. The amount of ink applied may be controlled by an ink key, which may be mechanically or electronically controlled, which controls dispensing of the ink from a reservoir. A plurality of ink keys may be disposed in the cross-process direction of the press, i.e., in the width direction of the sheet, and may be used to determine the quantity of ink dispensed within each stripe region of the image. In general, there may be four ink keys within each region, one for cyan ink (C), one for magenta ink (M), one for yellow ink (Y), and one for black ink (K).

Typically, in offset presses, multiple pages may be printed together on a single sheet of larger size paper stock. The situation is illustrated in FIG. 1, which shows a typical sheet 20 produced by an offset press. Multiple images, eight images 10 in the illustrated case, are printed on a single sheet 20 of paper stock. The printed sheet is output from the press in the direction shown. At various intervals of time, the press operator may remove a printed sheet from the output for inspection.

The operator may determine if areas of the printed sheet need adjustment, for example, if areas of the printed sheet are too light or too dark, or if certain areas of the images, such as flesh tones, need adjustment. To make this determination, the operator may refer to color control bars, consisting of for example, color test patterns 13a and 13b, one of which is printed within each region whose image characteristics may be controlled by a set of four ink keys. The control test patterns may include each of the colors, cyan (C), magenta (M), yellow (Y) and black (K). The operator may determine the density of each of the colors of ink on the control bar, either visually or by using an instrument such as a densitometer. If needed, the operator may adjust the control bars, and thus the printed image, using a set of ink key buttons available on a console 30.

Ink key buttons 50-70 displayed on console 30 may be used to input the operator's selection to a control program, which regulates the appropriate ink keys which regulate, respectively, the flow of ink to the lithographic plate and hence to the printed sheet. The ink key buttons may come in pairs, for example 50 and 52, which increase and decrease, respectively, the amount of each color of ink controlled by the associated ink key from the ink reservoir.

Each pair of ink key buttons, 50 and 52, and 60 and 62, for example, may control the ink dispensed within a certain width 12a and 12b of the printed sheet 20, respectively, as shown in FIG. 1. The widths 12a and 12b may also be the regions which contain the color test patterns 13a and 13b, for example.

While only seven pairs of ink key buttons are shown in FIG. 1 for simplicity of illustration, in reality there may be, and typically are, many more. For example, an offset press may have a set of ink keys for adjusting stripes only about 1.5" wide.

SUMMARY

There is no direct analog of the ink key functionality for offset printing devices in digital printing devices, such as electrophotographic or inkjet copiers and printers. Therefore, there may be an additional barrier to the use of digital copiers and printers, particularly those used for high-speed, high-volume production work, for users comfortable with the ink key approach used in offset presses.

Exemplary systems and methods may simulate the function of the ink keys of offset printing for use with non-offset printers. Such systems and methods may be useable with any type of digital printer, such as electrophotographic or ink jet copiers or printers, or any other non-offset image-forming device.

Exemplary embodiments of the systems and methods may provide a non-offset image forming device with an ink key-like functionality, including: a simulated ink key input device including a plurality of simulated ink keys, an ink key simulator, and an image forming unit which outputs an image adjusted by the ink key simulator, based on input from the simulated ink key input device.

Exemplary embodiments of the systems and methods in the following paragraphs show that it is possible to extend traditional ink keys, which only control ink amount, to include specific color attributes such as lightness, hue, contrast, saturation, etc. Similarly, exemplary embodiments provide for previewing changes on a display, before anything is printed on the press. However, it will be appreciated that embodiments that provide an operator with essentially the same functionality as with traditional ink keys are also possible and desirable.

The ink key simulator may be implemented as a dedicated interface for a single image forming device, or the ink key simulator may be implemented as a central console controlling a plurality of image forming devices, each of which may be controlled individually and independently. The ink key simulator may be implemented, for example, as a touch screen on a control panel of an individual device, or as a keyboard and display of a computer, for example to control one or more image forming devices.

Exemplary embodiments of the systems and methods described herein may make use of image based controls (IBC) technology, which control characteristics of the output of the image forming device by changing the pixels in the input image. Such image based controls may adjust the image by adjusting data corresponding to a given pixel, or by adjusting irradiation energy of the light source, for example, on the photoconductive drum. See U.S. Pat. No. 6,819,352, entitled "Method of Adjusting Print Uniformity," U.S. Pat. No. 6,744,531, entitled "Color Adjustment Apparatus and Method," U.S. Pat. No. 5,884,118, entitled "Printer Having Print Output Linked to Scanner Input for Automated Image Quality Adjustment," as examples of IBC methods. The entire disclosures of these patents are incorporated herein by reference. Using exemplary systems and methods, image based controls may be used to implement in non-offset printing devices, an ink key simulator that simulates the functions of ink keys of offset devices.

These and other features and advantages are described in, or are apparent from, the following detailed description.

BRIEF DESCRIPTION OF THE DRAWINGS

Various exemplary details are described with reference to the following figures, wherein.

DETAILED DESCRIPTION

Figure 2:
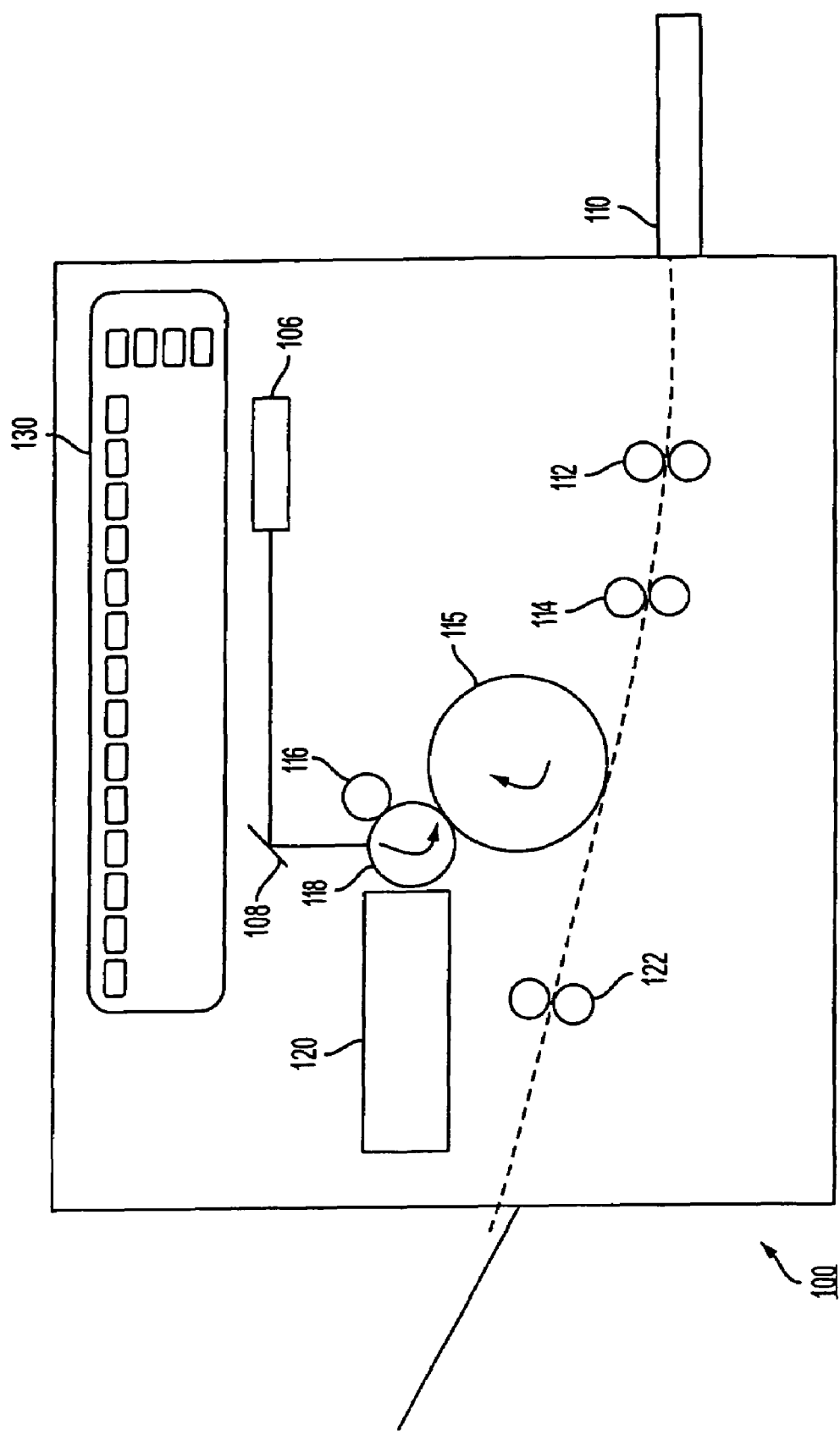
FIG. 2 is a schematic diagram of an exemplary simulated ink key interface for a non-offset image forming device.

FIG. 2 shows an exemplary schematic diagram of an ink key interface 130 applied to a non-offset image forming device 100. The image forming device 100 may be an electrophotographic image forming device, but this implementation is exemplary only. It should be understood that the systems and methods disclosed here can be applied to any non-offset image forming device, such as powder and liquid electrophotographic and ink jet printers. Furthermore, for ease of explanation, the exemplary non-offset image forming device 100 is a black-and-white digital image forming device, but it should be understood that the systems and methods disclosed here may be equally applicable to color image forming devices.

Although aspects of this disclosure may be applied to copiers, the following description is directed to printers for ease of explanation. A digital image file may be sent to a Digital Front End (DFE) where the image file may be rasterized. The rasterized data signal may then be transmitted to a laser light source 106, whose intensity may be modulated according to the value of the data signal. The output of the laser light source 106 may be guided by a Raster Output Scanner 108 to a photoconductive drum 118, and irradiate the surface of photoconductive drum 118.

Photoconductive drum 118 may be charged to a uniform potential by a charger 116. In areas which are irradiated by the laser light, the photoconductive drum 118 may be discharged, forming a latent image on photoconductive drum 118. A toner image may then be formed on photoconductive drum 118 by application of toner from a developing unit 120.

Image forming device 100 may include a paper cassette 110 from which a sheet of paper may be transported by transport rollers 112 and 114, and may contact a transfer drum 115 that rotates in the direction shown by arrow A. The toner image may be transferred from photoconductive drum 118 to transfer drum 115, which may transfer the toner image to the sheet of paper. The sheet of paper may then be separated from transfer drum 115, and transported to a fixing station 122. At fixing station 122, the toner may be fixed to the sheet of paper by, for example, heating the toner, until the thermoplastic material melts into the paper.

Although the exemplary image forming device 100 depicted in FIG. 2 is only a single color image forming device, it should be understood that a four-color image forming device may be readily constructed with a similar design, for example, by having three additional sets of photoconductive drums, chargers, and developing units, each corresponding to the additional colors of cyan, magenta and yellow, for example.

Figure 1:
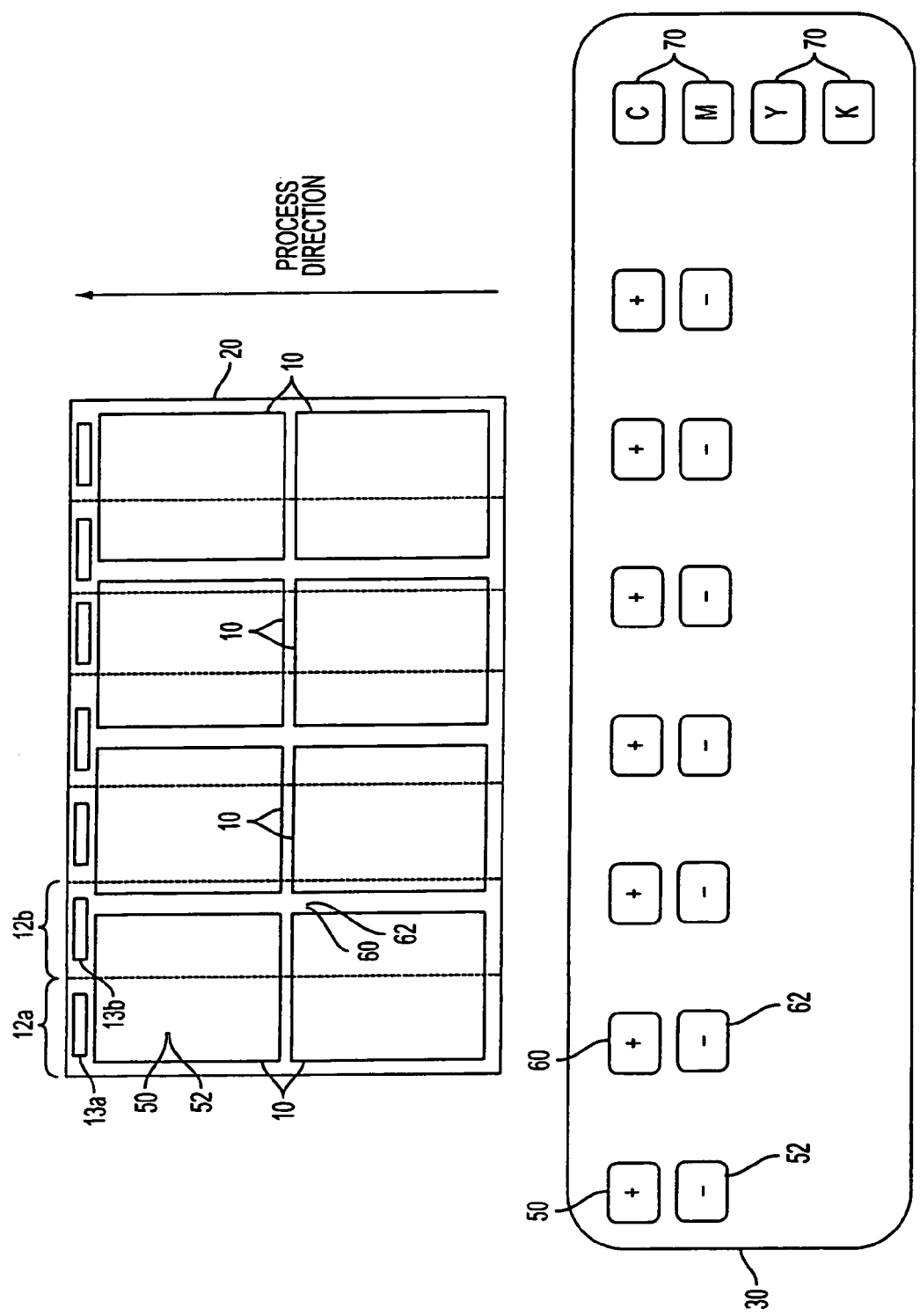
FIG. 1 is a schematic diagram of a known apparatus for adjusting ink keys in an offset press.
Figure 3:
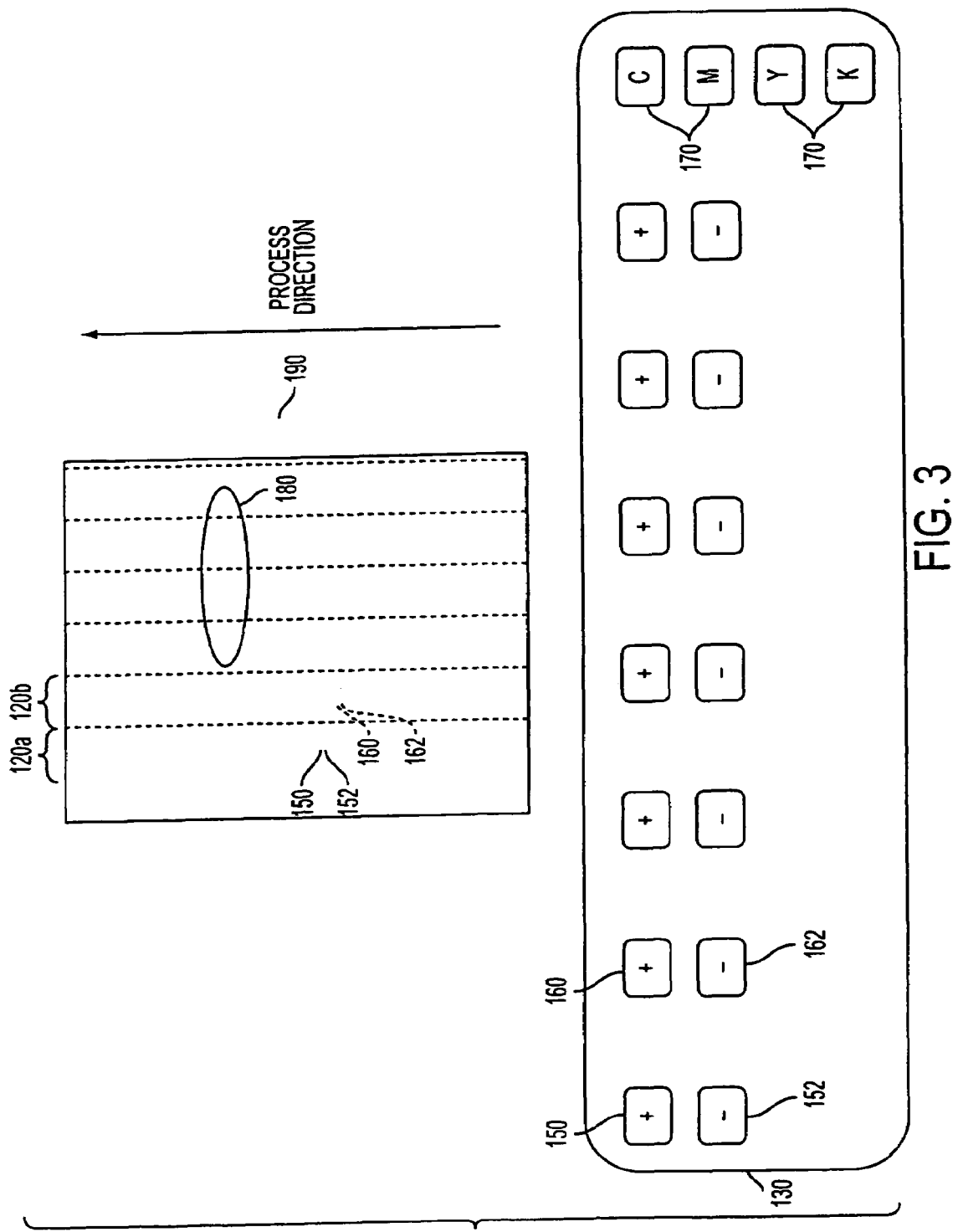
FIG. 3 illustrates the function of the simulated ink keys of the simulated ink key interface shown in FIG. 2.

A simulated ink key interface 130 may be implemented and may include a keypad similar in appearance to the ink key pad 30 of the offset printer described in relation to FIG. 1. Simulated ink key interface 130 may be a touch screen or a physical keyboard. An exemplary embodiment of simulated ink key interface 130 producing an image 180 on a sheet of paper 190 is shown in FIG. 3. The ink key interface 130 may include simulated ink keys 150, 152, 160, 162, and so on.

As illustrated in FIG. 3, each pair of simulated ink keys 150, 152 and 160, 162 may control the image characteristics within a vertical stripe of the printed page 190, the stripe being in the process direction as shown in FIG. 3. For example, simulated ink key pair 150, 152 may control the image characteristics in region 120a, and simulated ink key pair 160, 162 may control the image characteristics in region 120b of the printed sheet 190. Ink key 150 may be an increase ink density key, and ink key 152 may be a decrease ink density key, analogous to ink keys 50 and 52 of ink keypad 30. However, for the simulated ink key interface 130, touching simulated ink key 150, for example, may cause simulated ink key interface to direct a data manipulation routine to increase the data value for a pixel or group of pixels, rather than increasing the flow of ink from a reservoir. Alternatively, touching simulated ink key 150 may cause a laser controller to increase the intensity of the laser 106 for a pixel or group of pixels. Whatever mechanism is used, the result of touching simulated ink key 150 is similar to the effect of depressing ink key 50, in that, as a result, the density of the rendered image may be increased in region 120a. Similarly, depressing ink key 152 may result in a decrease of the density in region 120a of printed sheet 190.

For a color image forming device, the simulated ink key interface 130 may also include color keys 170, for example. Such keys may be operated in conjunction with ink keys 150, 152, 160, 162, etc., to adjust or control image characteristics in the various regions.

One advantage of the simulated ink keys, over, for example, the use of photo-editing applications, such as Adobe Photoshop®, is that the simulated ink keys may be used to adjust image quality on the production floor. Thus, image quality adjustment may be customized to the particular image forming device, and may be applied in real time or on-the-fly, that is, while the reproduction is underway. In addition, the use of simulated ink keys may re-create an operator interface for digital reproduction services which is very similar to that with which operators are already familiar, which is ink keys for offset printing. The familiarity of the interface, and its real-time adjustment capabilities, may reduce the barrier for adopting digital reproduction technologies for high volume printing services.

As shown in this exemplary embodiment, there may be, for example, seven pairs of simulated ink keys which span the cross-process direction of printed sheet 190. However, it should be understood that this embodiment is exemplary only, and that any of a number of other embodiments having any number of additional, or fewer, simulated ink keys may be envisioned.

Further, the exemplary simulated ink key interface 130 is depicted as an interface dedicated to a single image forming device 100. Alternatively, a simulated ink key interface may be in the form of a central control console, configured to control a plurality of image forming devices. An exemplary central control console 200 is shown schematically in FIG.

Figure 4:
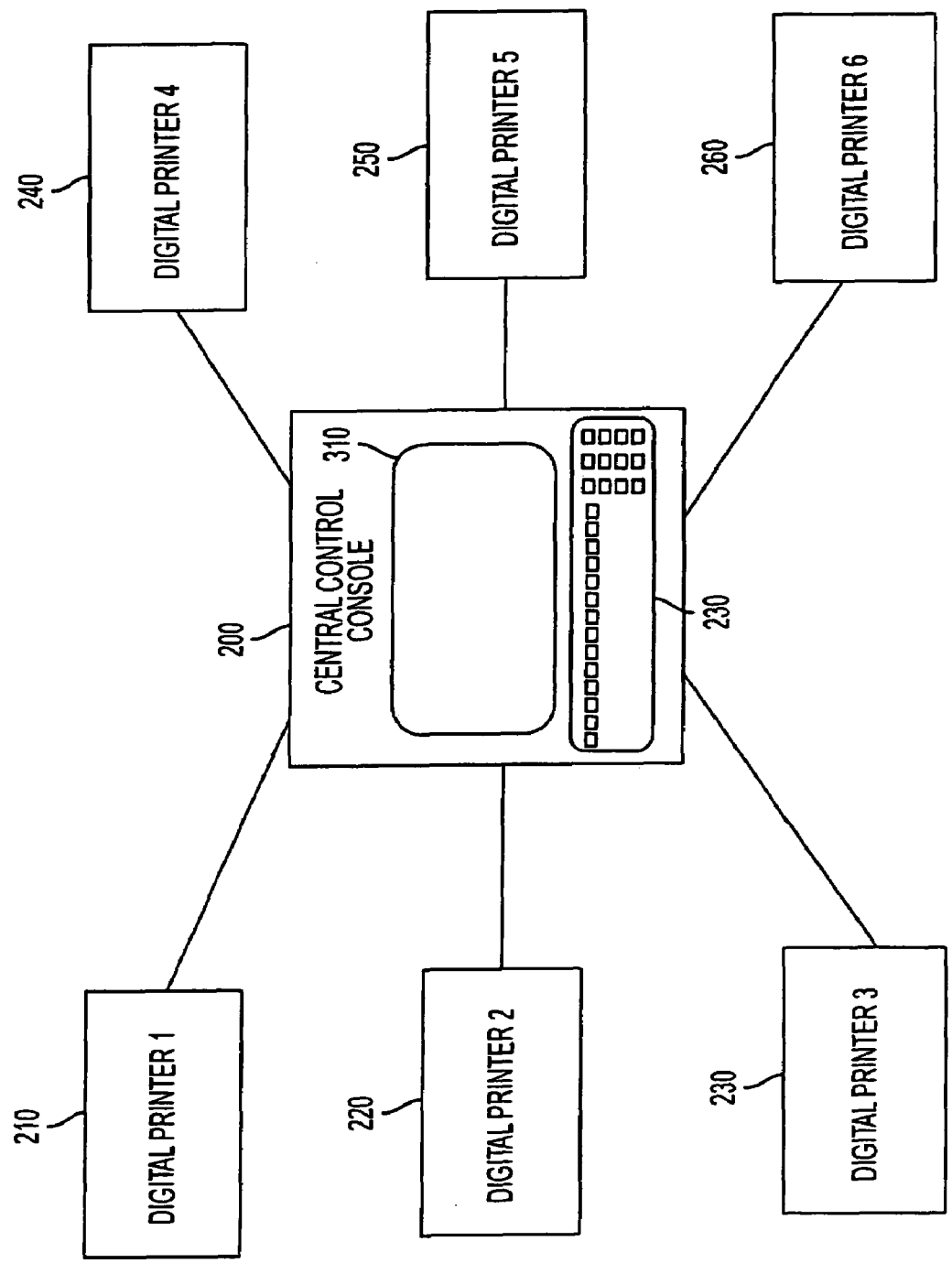
FIG. 4 shows an exemplary implementation of the simulated ink key interface for a plurality of non-offset image forming devices.

4. In FIG. 4, central control console 200 may control each of, for example, six different digital printers 210-260. Central control console 200 may include a simulated ink key interface 230, which may be similar in design and layout to simulated ink key interface 130. The simulated ink key interface 230 may be configured to selectively control one or more of the printers 210-260, for example, as described above.

Particularly in the case of the central control console 200, it may be appropriate to include a display 310 on the control console. Using the display 310, the effect of depressing a simulated ink key may be demonstrated for the operator, prior to printing out the image. For example, depressing simulated ink key 150 may cause the pixel values in region 120*a* of image 200 to be changed. The expected result of the change in pixel values may be rendered on display 310 for the operator's approval, before printing out the sheet 190.

Figure 5:
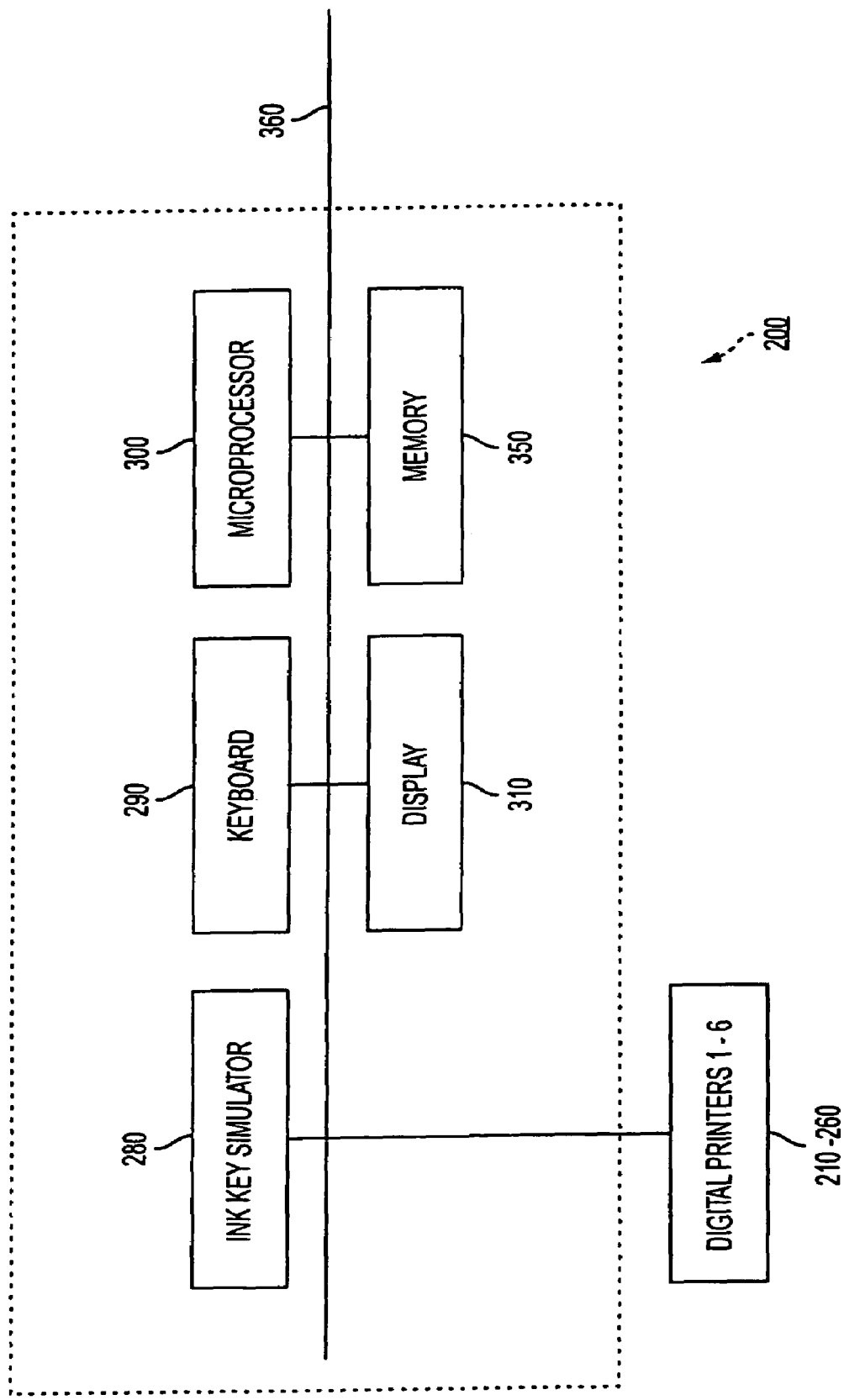
FIG. 5 is a functional block diagram of an exemplary digital image forming device with an ink key simulator.
Figure 6:
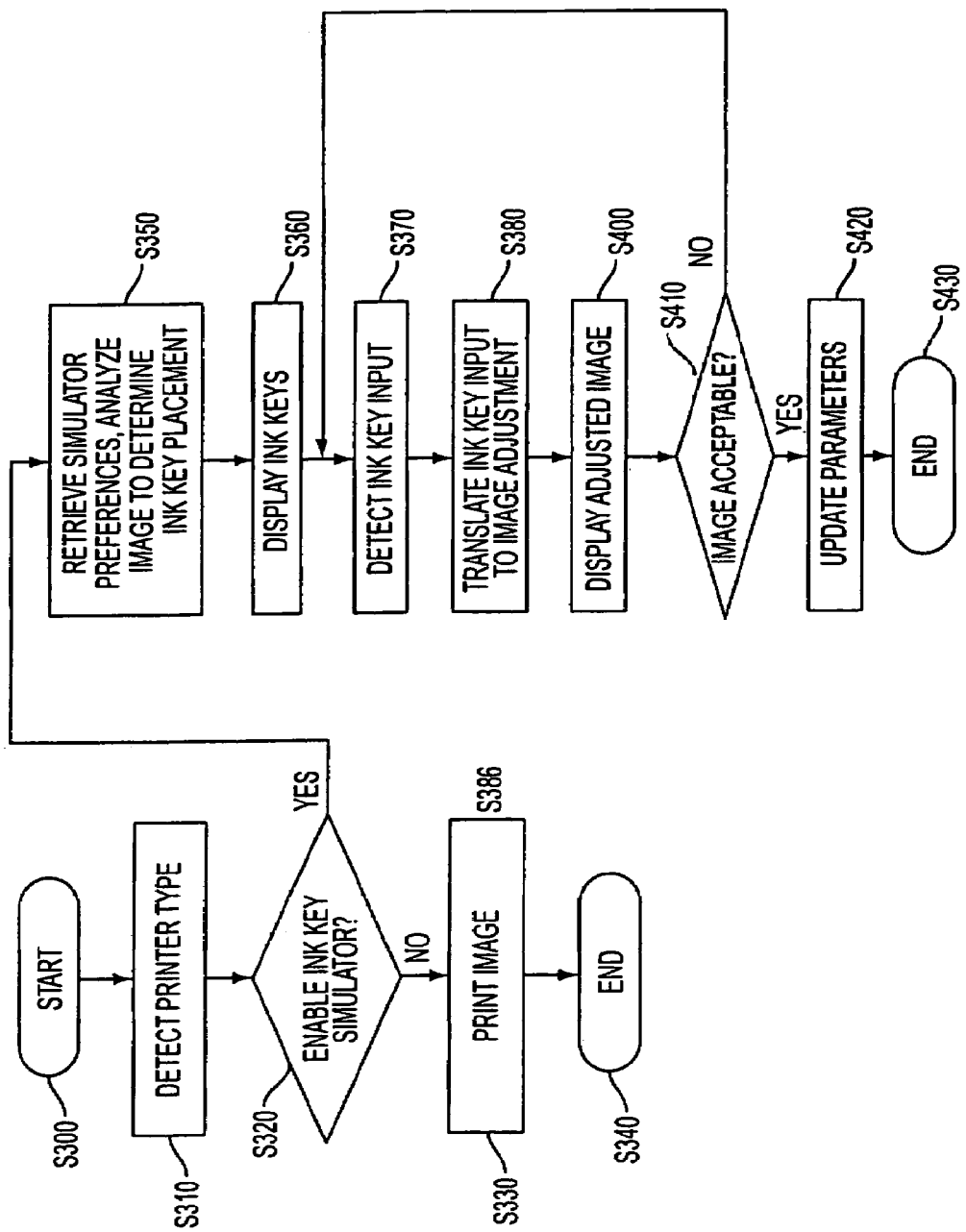
FIG. 6 is a flow diagram of an exemplary method of implementing simulated ink keys for a non-offset image forming device.

FIG. 5 is an exemplary functional block diagram showing details of central control console 200. It should be understood that not all of these elements may be necessary, and in particular, may not be necessary for the simulated ink key interface 130 which is dedicated to a single image forming device. Central control console 200 may include a display 310, a memory 350, a microprocessor 300, a keyboard 290, and an ink key simulator 280, and may be connected to digital printers 210-260. Each of the aforementioned elements 280, 290, 300, 310 and 350 maybe coupled by a bus or network 360, which may also be coupled to the digital printers 210-260. Each of the elements may be implemented as components of an application-specific integrated circuit (ASIC). Any combination of hardware and software may be used to implement the components of central control console 200 as illustrated in FIG. 5.

The ink key simulator 280 may receive input from the keyboard 290, for example, which selects one of digital printers 210-260, and indicates an increase or a decrease in color intensity in the designated region of the image indicated on the display 310. The ink key simulator may then adjust the data stored in memory 350, corresponding to the pixels indicated, by depressing the appropriate key on keyboard 290. The ink key simulator may then send the adjusted data to the light source of the digital printer 210-260 indicated by the input to keyboard 290. The ink key simulator may also update the image displayed on display 310, to reflect the adjusted data, that is, showing the adjusted image before commanding the digital printer 210-260 to output the adjusted image.

An exemplary relationship between the adjusted pixel values and the number of keystrokes depressed on keyboard 290, is as follows. The pixel values remain unchanged until a key is depressed on keyboard 290. Then, depending on the number of keystrokes made on keyboard 290, the pixel value may be adjusted accordingly. For example, each time the simulated ink key 150 is depressed, the nominal values of pixels in the region corresponding to 120*a* may be increased by a corresponding amount, depending on the original value and the particular IBC algorithm used. Thus, the actual change in "pixel value" may be complex, for example, as developed in the IBC technologies referenced above.

Algorithms which implement changes in digital data for digital printers exist, for example, image based control (IBC) technology developed at Xerox Corporation to automatically remove non-uniformities, for example in the cross-process direction. IBC technology provides, for example, spatially local adjustment of the tone reproduction curve (TRC) across the process direction. The tone reproduction curve is the relationship between the pixel value and the color. The TRC adjustment may be done at pixel resolution, much finer than the typical offset press ink keys. If desired to simulate the broad (low resolution) region of control of traditional ink keys, ranges of pixels may be adjusted together (ganged).

However, to the extent that pixels are ganged within regions, and treated in a uniform manner as a result of the activation of a simulated ink key, there may arise some artifacts at the boundary between regions controlled by different simulated ink keys. For example, at the boundaries between regions, there may appear discontinuities between the color intensity levels as a result of the application of the adjacent simulated ink keys. To suppress the appearance of such artifacts, the pixel values across the boundaries may be smoothed using any of a number of mathematical smoothing algorithms, such as cubic splines or linear interpolations.

Traditional offset press ink keys control only the thickness of the ink layer delivered, and therefore affect the entire tone reproduction curve. Using simulated ink keys with IBC technology, it is possible to adjust the shape of the tone reproduction curve. Similarly, each of these adjustments may alter multiple ink primary colors at once, so it is also possible to make other types of color adjustments, such as lightness, hue, contrast and saturation, using the simulated ink key paradigm. In addition, the simulated ink keys may control a two-dimensionally defined area, instead of the one-dimensional (i.e., in process direction only) nature of the traditional offset press ink keys.

Although these adjustments may not be available on offset printers using ink keys, such capabilities may be straightforward to offer using a simulated ink key interface for a digital printer or copier. Although the examples of lightness, hue, contrast and saturation are discussed, many other types of color adjustment may also be implemented that may be achieved by altering the pixel values or the irradiation energy of the light source on the photoconductive drum, for example, in unison across multiple ink primary colors.

The simulated ink key interface may be implemented using either a physical keyboard, such as keyboard 280, or on a display screen 300. The display screen 300 implementation, however, may be more convenient or more intuitive for implementing two-dimensional simulated ink keys.

While offset presses, by typical application of the ink keys, cannot adjust two-dimensional areas of the image, and cannot adjust the shape of the tone reproduction curve, the functionality of the intuitive simulated ink keys may be expanded with such additional image control capabilities.

The simulated ink key configuration on image 380 may also be pre-selected by the ink key simulator, based on the type of object contained in image 380. Such "object oriented correction" may allow text, graphics and pictorial elements, for example, by virtue of having been identified as such, to automatically invoke a corresponding set of ink keys and a first configuration of their settings. These automatic configurations may then be adjusted manually by the operator to improve other aspects of the image.

Another feature of the simulated ink key approach may be that the ink keys need not all correspond to the same size region in the image. The size of the area that each of the simulated ink keys may correspond to may be made variable, so that, for example, regions of the image having features which require fine manipulations, such as human faces may be controlled on a smaller scale than regions of the image not requiring such fine manipulations, such as sky or water. Generation of intelligent placement of the ink keys, depending on the content of the image, may be done manually or automatically, or a combination of both, via image processing on the print ready format, or via analyzing the content of print data stream such as in PDF or Postscript format. The size and configuration of the ink key regions may then be selected automatically by the ink key simulator, in combination with the "object oriented correction" described above, for example, and then adjusted manually by the operator.

Having configured the ink keys over the printed sheet in the manner desired, the operator may then choose the mode (ink amount, or lightness, for example), and may then input the magnitude of the ink key alteration by touching or depressing the ink key one or more times. The ink key simulator may then alter the data accordingly, and may smooth the transitions between regions. Each of the key selections, the configuration of ink keys on the printed sheet, along with the altered data file, may be stored as part of the print-ready file, perhaps along with the unaltered data, to allow the original document to be printed.

Figure 7:
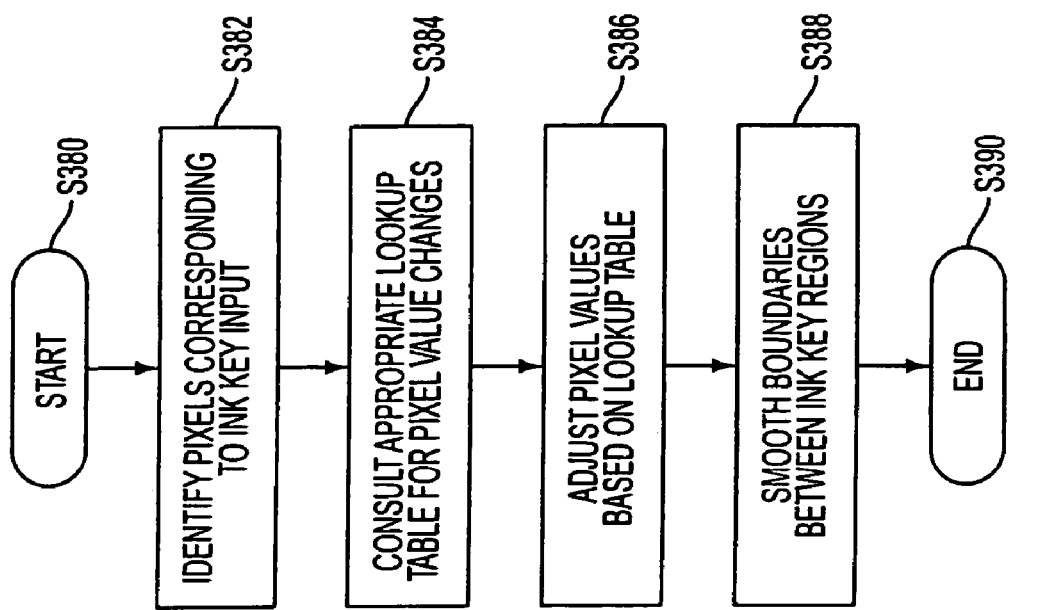
FIG. 7 is a flow diagram illustrating exemplary details of step S380 of FIG. 6.

FIG. 7 is a flow chart illustrating an exemplary algorithm for applying simulated ink keys to a digital printing operation. The method starts in step S300 and continues to step S310, wherein the printer type may be detected. If the printer type is one supported by the ink key simulator, a determination may be made in step S320, whether to enable the ink key simulator. If not, the image may be printed as is in step S330, and the process ends in step S340.

If the ink key simulator is enabled in step S320, the process continues to step S350, where the simulator preferences may be retrieved from memory. The simulator preferences may be associated with a particular operator, or a particular type of image. The ink key simulator preferences may include the layout of simulated ink key regions within the image, or the actual values of the simulated ink key alterations as previously applied to the image. Step S350 may also include an analysis of the input image to determine a first placement of ink keys within the image, such as uniform strips or according to, for example, object oriented correction. The process continues to step S360, where the simulated ink keys may be displayed, for example on a touch screen. In step S370, the ink key input may be detected, that is, the depression or activation of simulated ink keys may be detected.

In step S380, the simulated ink key input may be translated into the appropriate image adjustment, by, for example, adjusting the pixel values in response to one or more depressions of a simulated ink key. In step S400, the adjusted image may be displayed for the operator. In step S410, a determination may be made whether the image is acceptable. If so, the ink key parameters may be updated in step S420, and the process may end in step S430. If the image is not acceptable, control returns to step S370, where additional input is detected from the simulated ink keys. It should be noted that, in traditional offset printing, printing is not stopped while the ink keys are adjusted, adjustment being done while continuously printing.

It should be understood that not all of the process steps outlined in FIG. 7 may be necessary to implement the ink key simulation approach. For example, the system may not be equipped with a display for displaying the results of the simulated ink key input on the image before printing the image. In this situation, the image may be printed without executing step S400. Furthermore, it may not be necessary to detect the printer type in step S310, as the simulated ink key interface may be a dedicated interface for example, as depicted in FIG. 2.

FIG. 8 illustrates additional exemplary details of step S380 of FIG. 7, relating to translation of the simulated ink key input into an appropriate image adjustment. The process begins in step S380, and continues to step S382, where the appropriate pixels may be identified which correspond to the ink key input. In step S384, a lookup table may be consulted to determine the appropriate amount of pixel adjustment for the corresponding ink key input. As an alternative to the lookup table, a functional relationship may be used to determine the appropriate amount of pixel adjustment. In step S386, the pixel values may be adjusted. The process continues in step S388, where the boundary between the ink key regions may be smoothed by further adjusting the pixel values, according to, for example, a spline curve or a linear interpolation. The process may end in step S390.

It should be understood that the details illustrated in FIG. 10 are exemplary only, and various other methods of adjusting the image may alternatively be used. For example, the light source energy or intensity may be adjusted over a given range on the photoconductive drum, in order to adjust the appearance of the output image within the different simulated ink key regions. Alternatively, the charge distribution may be modified by, for example, an addressable pin corotron.

By using simulated ink keys as described above, operators may control and adjust the output quality of digital printers using an interface with which they are already intuitively familiar. Such a simulated ink key interface may thereby ease the barrier to adoption of digital reproduction techniques to large scale printing. The systems and methods described above may also be relatively straightforward to implement, as the underlying image based control (IBC) systems may already be in development or employed.

Other non-offset printing technologies, such as inkjet printing, may adopt the systems and methods described above. Similarly, the ink key implementation may be applied to adjustment of other color attributes, in addition to ink amount, such as hue, contrast and saturation.

It will be appreciated that various of the above-disclosed and other features and functions or alternatives thereby, may be desirably combined into many other different systems or applications. Also, various presently unforeseen or unanticipated alternatives, modifications or improvements therein may be subsequently made by those skilled in the art which are also intended to be encompassed by the following claims.

What is claimed is:

1. A non-offset image forming device, comprising:
   a simulated ink key input device including a plurality of simulated ink keys;
   an ink key simulator; and
   an image forming unit configured to output a printed image from image data adjusted by the ink key simulator based on input from the simulated ink key input device.

2. The device of claim 1, further comprising a xerographic image forming unit.

3. The device of claim 2, wherein the image forming unit further comprises an imaging light source, the imaging light source being configured to modulate power thereof according to pixel values of the image data and based on input from the simulated ink key input device.

4. The device of claim 1, wherein the image forming device further comprises a module configured to adjust pixel values of the image data based on input from the simulated ink key input device.

5. The device of claim 4, wherein the ink key simulator is configured to control the module to adjust pixel values of the image data within a region of the image corresponding to a region addressed by a corresponding simulated ink key.

6. The device of claim 4, further comprising:
a memory configured to store the adjusted pixel values, the image forming unit being configured to access the adjusted pixel values from the memory.

7. The device of claim 1, wherein the ink key simulator is configured to adjust at least one of primary ink levels, lightness, hue, contrast and saturation, depending on a mode selected for the simulated ink key input device, using image-based controls.

8. The device of claim 1, further comprising a processor configured to alter pixel values of the image data near a boundary of one region corresponding to one simulated ink key and another region corresponding to another simulated ink key, based on a smoothing algorithm, to smooth a transition between pixel values near the boundary.

9. The device of claim 1, wherein the simulated ink keys comprise at least one of designated areas on a screen and keys on a key pad.

10. The device of claim 9, wherein the simulated ink keys comprise at least one of buttons on a touch screen, and buttons on a screen activated by a mouse or other pointing device.

11. The device of claim 1, wherein each simulated ink key corresponds to at least one of a stripe in a process direction of the image and a two-dimensional region within the image.

12. The image forming device of claim 11, wherein a region corresponding to one simulated ink key is different in size than another region corresponding to another simulated ink key.

13. A method of forming an image on a recording medium using a non-offset image forming device, comprising:
inputting an ink key adjustment with a simulated ink key;
adjusting at least one of a pixel value and an imaging light source intensity in a region of the image corresponding to the simulated ink key based on the input ink key adjustment; and
forming the image on the recording medium with at least one of the adjusted pixel value and the adjusted light source intensity.

14. The method of claim 13, further comprising smoothing a boundary between regions in the image corresponding to different simulated ink keys, using at least one of a spline interpolation and a linear interpolation for pixel values near the boundary.

15. The method of claim 13, further comprising adjusting at least one of primary ink levels, lightness, hue, contrast and saturation based on the input ink key adjustment.

16. The method of claim 13, wherein inputting an ink key adjustment with a simulated ink key comprises at least one of touching a designated area on a touch screen, activating a button on a screen by a mouse or other pointing device, and depressing a key on a keypad.

17. The method of claim 13, further comprising:
storing the adjusted pixel values in a memory; and
accessing the adjusted pixel values from the memory to form the image on the recording medium.

18. The method of claim 13, wherein adjusting at least one of a pixel value and a light source intensity in a region of the image corresponding to the simulated ink key comprises adjusting using image based control tools.

19. The method of claim 13, wherein the region of the image corresponding to the simulated ink key is at least one of a stripe in the process direction and a two-dimensional region within the image.

20. The method of claim 19, wherein a region corresponding to one simulated ink key is different in size than another region corresponding to another simulated ink key.

* * * * *